United States Patent [19]

O'Dowd

[11] Patent Number: 5,235,595
[45] Date of Patent: Aug. 10, 1993

[54] PACKET SWITCHING

[75] Inventor: Michael B. O'Dowd, Victoria, Australia

[73] Assignee: Fischer & Porter Company, Warminster, Pa.

[21] Appl. No.: 296,524

Related U.S. Application Data

[63] Continuation-in-part of PCT/AU88/00130, May 6, 1988.

[22] Filed: Jan. 6, 1989

[30] Foreign Application Priority Data

May 6, 1987 [AU] Australia .................. PI 1781

[51] Int. Cl.⁵ ................................ H04J 3/24
[52] U.S. Cl. .................... 370/94.1; 370/60; 370/85.15
[58] Field of Search .............. 370/60, 94.1, 85.12, 370/58.1, 92, 94.3, 85.13, 85.14, 85.15, 16; 340/825.5, 825.51, 825.52

[56] References Cited

U.S. PATENT DOCUMENTS

| | | | |
|---|---|---|---|
| 4,058,838 | 11/1977 | Crager et al. | 370/60 |
| 4,074,232 | 2/1978 | Otomo et al. | 340/147 |
| 4,082,922 | 4/1978 | Chu | 370/94.1 |
| 4,156,798 | 5/1979 | Duelz | 370/85.12 |
| 4,287,592 | 9/1981 | Paulish et al. | 370/88 |
| 4,312,063 | 1/1982 | Warner | 370/68 |
| 4,345,326 | 8/1982 | Dieudonne | 370/60 |
| 4,380,061 | 4/1983 | Mori et al. | 370/85.12 |
| 4,383,155 | 5/1983 | Torng | 370/89 |
| 4,424,463 | 2/1984 | Quinquis | 364/200 |
| 4,472,801 | 9/1984 | Huang | 370/56 |
| 4,482,999 | 11/1984 | Janson et al. | 370/94.1 |
| 4,500,987 | 2/1985 | Hasegawa | 370/94.1 |
| 4,525,837 | 6/1985 | Tan et al. | 370/85 |
| 4,550,402 | 10/1985 | Gable et al. | 370/85 |
| 4,566,095 | 1/1986 | Devault et al. | 370/60 |
| 4,569,041 | 2/1986 | Takeuchi et al. | 370/85.15 |
| 4,584,677 | 4/1986 | Kosaka | 370/85.12 |
| 4,597,077 | 1/1986 | Nelson et al. | 370/88 |
| 4,625,306 | 11/1986 | Newman | 370/60 |
| 4,698,799 | 10/1987 | Amstutz et al. | 370/58.1 |
| 4,768,190 | 8/1988 | Giancarlo | 370/94.1 |
| 4,777,595 | 10/1988 | Strecker et al. | 364/200 |
| 4,815,071 | 3/1989 | Shimizu | 370/94.1 |
| 4,910,732 | 3/1990 | Schwarz | 370/85.1 |

OTHER PUBLICATIONS

R. J. Folmar "Distributed Memory Network: an 8 Gigabit Fiber Optic Tightly Coupled System" Proceedings of the IEEE 1985 National Aerospace and Electronics Conference pp. 91–94.

Primary Examiner—Benedict V. Safourek
Assistant Examiner—Alpus H. Hsu
Attorney, Agent, or Firm—Ratner & Prestia

[57] ABSTRACT

This invention is concerned with packet switching techniques, protocols, networks, and equipment for use on a local area or wide area scale. Packets which include a fixed-length data field and memory offset field are employed so that packeting, block data transfer to contiguous memory and depacketing can be effected at the destination by hardware-mediated processes with minimal processor involvement. Multiple sessions can be readily handled by assigning addresses to multiple memory buffers at the destination. Thus, each packet carrying computer data provides three levels of addressing for its data segment corresponding to the destination node or device, the memory buffer for the data block being transferred and the memory location within that buffer into which the segment of data carried by the packet is to be placed. The equipment includes loop-based, collision-free packet switches in which packets are modified and re-circulated when a destination is busy. This allows a high-speed loop to transfer packets to and from devices running at various (lower) speeds. Loop latency is minimized and data transfer rates maximized by the use of fully-buffering parallel forms of the switch. A method for handling broadcasts is also disclosed, together with a technique for preempting low priority packets and exploiting short-cuts on a loop. These improvements allow application of the technique to a high-speed voice/data packet-switching in large wide area networks as well as in small local area networks. By using the methods and equipment disclosed, an extensive, powerful and extremely fast integrated communications subnet can be largely built in hardware with little need for processor intervention.

6 Claims, 9 Drawing Sheets 5,235,595

PACKET SWITCHING

This is a continuation-in-part of application Ser. No. PCT/AU88/00130 with an International Filing Date of May 6, 1988 designating the United States.

TECHNICAL FIELD

This invention relates to packet switching networks, methods, protocols, switches and nodes (network interface units) suitable for use in integrated local or wide area networks (LANs or WANs). It is concerned, more particularly, with loop-based methods of collision-free packet access and with end-to-end data transfer techniques which can be substantially implemented in hardware.

It is generally concerned with the provision of a sub-net, comprising important elements of the Network, Transport and Session Layers (Nos. 3, 4 and 5) of the ISO Reference Model, which will facilitate high speed end-to-end communication and provide a basis for integrated realtime (voice, video, sensor/control and some terminal traffic) and non-realtime (facsimile, electronic funds transfer transactions, computer file transfers) data transmission. Known methods of data transmission, packet routing, congestion control, session establishment etc. may be employed to complete such a sub-net.

The techniques and apparatus of this invention may also be used in some existing packet-switched networks to advantage. In some aspects, for example, the invention is applicable to the transfer of data in and between existing networks, between the time slots in multiple TDM (time division multiplexed) carriers, between a computer and its peripherals, and between the multiple processors and memory elements of MIMD (multiple instruction multiple data) computers.

The References listed at the end of the specification review the field of packet switching and discuss the ISO Reference Model.

BACKGROUND ART

Packet-switching offers the promise of greater efficiency in the utilization of a common communications network of lines and switches by dividing user messages (or data blocks) into short, self-addressed packets, transporting the packets over the network, and re-assembling them at each of their various destinations. But, despite great advances in computing and telecommunications in recent years, end-to-end (device-to-device) communication rates across packet-switched networks have improved little.

The primary reason for this impasse is the software (and thus processor) burden imposed on node processors by the programmed interrupt-mode input/output structures involved in packet handling. The functions involved include: packeting the message and appending the correct control and address information; putting the packet onto each successive link enroute to its destination without collision with other packets (or, if there is collision, recovering from it; checking and re-routing it at each switch; checking it for validity and sequence, and re-ordering it if necessary (at least at the destination if not at every switch); acknowledging each correct packet and requesting missing, corrupted or out-of-sequence packets to be re-transmitted; retransmitting missing or corrupted packets and fitting them into place: and depacketing the data to re-create the original message. Not only does this slow end-to-end communication, but it means that node processor capacity is not available to provide advanced user-oriented facilities such as protocol conversion for different device, multi-session windowing, encryption and the provision of enhancements to 'dumb' computer terminals and digital phones.

The problem is compounded if any link enroute, or the destination node, is temporarily congested and packets must be discarded or queued for transmission sometime later, but queuing adds the burden of queue management to that of packet management for nodal processors. Voice data is inherently burstly and intolerant of delay but can accommodate the random loss of a small percentage of packets. Computer data is tolerant of delay, but the loss of even one packet may involve the retransmissions of many others, thereby exacerbating any congestion problem. Other data, such as real-time controls information, may well be unable to tolerate either appreciable delay or packet loss. Thus, packets cannot be discarded indiscriminately in integrated systems.

Different strategies for addressing these problems in computer communications exist. Very large packets can be permitted (as in SNA) to reduce the cumulative effect of per-packet processing, but in so far as such packets are used, the advantages of packet-switching are lost. The burden of error checking at the destination and end-to-end re-transmission can be reduced by the use of point-point/store-and-forward protocols (as in ARPARNET and SNA), but overall processor involvement is greatly increased thereby, particularly if all packets of a block or message are re-sequenced at each intermediate point. Alternatively, the end-point processor can be made to do almost all the work in a simple end-to-end data gram service (as in DECNET) in which packets need not be delivered in sequence, may be discarded (eg. for congestion control), may be duplicated or may loop within the network. None of these approaches are suited to the handling of voice packets and, with the exception of SNA, are not concerned with Session Layer communication. All allow long and variable-length packets, thereby suffering high latency.

As TDM is commonly used for the multiplexing of digital voice channels, and as it offers shorter packet delays, collision-free access and the preservation of sequence, its application to integrated wide-area packet-switched networks has been proposed, despite the attendant equipment costs. However, as shown by the comprehensive TDM system disclosed in U.S. Pat. No. 3,749,845 to Bell Laboratories, very substantial processor burdens at nodes and switches are involved, even though end-to-end Transport and Session Layer protocols were not addressed. U.S. Pat. Nos. 3,979,733 to the same assignee sought to reduce this apparently impractical processing burden by the use of a hardware-implementable technique for buffering and re-addressing packets as they are taken off one TDM trunk and put onto another. But that only addressed a relatively minor part of the problem. With similar effect, U.S. Pat. No. 4,491,945 to the same assignee, disclosed hardware-based Banyan-type packet switches and a scheme for rotating address bit as packets transit the switches.

Sequencing of packets, particularly computer data packets, is necessary in packet switched systems where successive packets may be routed differently or variably buffered. Various protocols are employed to properly sequence packets in computer communications are reviewed in the Tanenbaum reference. A short sequence number field in the packet is used together with a 'sliding-window' at the receiving node to identify the next packet expected. In the simplest protocol, any out-of-sequence packet and all subsequent packets in a block (or file) transfer are re-transmitted, leading to significant delays and lost bandwidth. In the more complex protocol, a buffer is set aside for each packet of a block transfer at the destination node and each packet is placed into the appropriate buffer as it arrives. As long as there are no earlier gaps, the node processor can either commence to assemble the packets into a contiguous block for transfer to the appropriate session, or read the packets from the buffers in correct sequence to a host processor. If there are gaps, the missing packets can be identified for re-transmission. The latter method is impractical where packets differ widely in length, the block size is large, or blocks may comprise large numbers of packets. Moreover, it requires more buffer space, double-handling of packets and an even greater demand on software processes at the destination.

In all prior packet switching systems for handling computer data known to the applicant, the destination node or host processor is interrupted every time a correct packet is received in sequence in order to determine the length of its data segment, to allocate the correct memory location for the data and to transfer the data to that location, so that the original message will finally be assembled. While the use of hardware-mediated DMA (direct memory access techniques) for transferring data to and from memory locations substantially without processor involvement is well known in computer design (see the Shiva Reference), similar techniques have not been used or proposed (to the applicant's knowledge) for the transfer of data from memory to memory across a network. The necessary bus, data, address and control lines for DMA are not available in a network and the problem of out of sequence bytes does not arise in DMA transfers within computers. Nevertheless, if similar hardware-based techniques could be used for data transfer across a network, substantial advantage would be gained.

Asynchronous, collision-free, network access under fully distributed control is recognised as being essential for wide area packet-switched networks, and known ring-based systems (such as the register insertion loops and rings, slotted-rings and token passing rings reviewed in the Trooper and Tanenbaum References) offer these features. In general, however, ring-based systems are regarded as being inherently unsuited for use in WANs because of their ring structure. Nevertheless, register insertion loops are of particular interest because they provide some degree of inherent packet storage or buffering and can have at packets in transit at the same time between different pairs of nodes on the ring.

Register, buffer or delay insertion secures distributed and contention-free media access by the simple expedient of delaying any incoming packet in a register or buffer (herein called the hold FIFO (first-in, first-out register) while an outgoing packet is being placed on the loop. The Tropper and Tanenbaum References review non-contention loop systems, including register insertion, and note the various ways in which the inherent latency in the transfer of data around a register insertion loop may be minimised. That problem is addressed in greater depth in the other References.

Register insertion switches intended for substantial implementation in hardware and voice/data packet communications in LANs are disclosed in U.S. Pat. No. 4,500,987 to NEC and No. 4,168,400 to CETT. Each assigns a higher priority to voice packets (identified in a type field) and allocates each type of packet to separate first-in-first-out (FIFO) queues at each switch or node. Control logic, is used to select highest priority packets for transmission in gaps between packets on the asynchronous loop, or in place of lower priority packets on the loop. The switching nodes are distributed geographically around the media of a serial loop.

The NEC patent effectively allocates bandwidth on demand for voice connections by reserving a circulating packet 'space' to effect duplex communication. But this carries the penalty that many of the reserved packets will be empty, thereby foregoing a major advantage of packet switching in integrated systems (the ability to fill voice gaps with data packets). To maintain loop synchronization fixed-length packets are used and the loop transmission delay is dynamically adjusted to an integer multiple of the length the packets. The CETT patent argues advantage in being able to use the more efficient variable-length packets and discloses a method for inserting them on a loop in place of corrupted packets. Neither patent discloses methods suited to the end-to-end handling of data packets at the Network, Transport or Session Layers.

The simple acknowledgement protocol used in such ring-based systems (see the Bridges Reference for an example) is that the destination copies each packet which it can receive and sets an acknowledgement (ACK) flag in the original packet which then continues around the ring to the source where it is removed. If the destination node is busy, it cannot copy the packet and does not set the ACK flag. The source then has the option of removing the packet and retrying later or allowing the packet to circulate a few more times before removing it. This protocol not only ties up the source when a destination node is busy, but also makes it impractical to handle broadcasts, especially where a few of the addressed nodes are busy. Furthermore, it is impractical in multi-loop systems (necessary in WANs) and it is largely for this reason such loop-based systems tend to be confined to single-loop LANs.

It should be noted that the terms loop and rings are used synonymously in this specification, though 'loop' is often used for systems in which the whole packet is received before relay and 'ring' is often used for systems in which the bits of a packet stream through each station. It should also be noted that reference to a loop in this context does not exclude a dual loop, one for each direction, shared by all switch elements.

DISCLOSURE OF THE INVENTION

It is thus the objective of the present invention to address—severally or jointly—the problems indicated above in order to provide improved packet switching methods, networks, switches, nodes and/or protocols.

From one aspect, this invention involves the inclusion of a memory reference (e.g., an offset) in packets having fixed-length (and, preferably short) data fields, so that hardware-mediated procedures can be used at the source to generate the memory references and, at the destination, to both generate an appropriate memory addresses and transfer the respective data segments thereto. This relative the endpoint processors of considerable interrupt-driven processing. Such a 'direct memory transfer' (DMT) process would substantially look after packeting, depacketing, sequencing and transfer to contiguous memory and is, of course, best suited to the transmission of computer data. In this context, a short data field is one of less than 560 bits and, preferably, less than 240 bits.

The DMT hardware at the source also computes a block-check sum over an entire block transfer and incorporates it into an end-of-block packet. At the destination end, the DMT hardware computes its own checksum, compares it to that received in the end of block packet, sends an appropriate ACK (positive acknowledgement) or NAK (negative acknowledgement) to the source, and (if an ACK is sent) interrupts the node processor to service the buffer containing the block. In this way, very large data blocks can be transferred with only one processor interrupt at each end. Should, however, NAKs be received indicating, say, an unexpectedly noisy line, the DMT hardware (or the communications software) could negotiate the use smaller blocks for further transfers to that destination; and, if the line improved, large data blocks would be negotiated.

In effect, each packet has three levels of addressing: a primary address identifying the destination node or switch element in a given region, (herein called the node address), a secondary address identifying the buffer at the destination node (herein called the socket, or half-session, number), and an implicit tertiary address signifying the memory location within the identified buffer into which the data segment of the packet is to be put (herein called the memory reference). Additional levels of addressing, or known methods of node address translation, may be used in order to convey packets across regions in WANs.

From another aspect the invention provides a loop-based packet switch and method which can also be largely implemented in hardware and is well suited for use with the DMT technique indicated above. The switch comprises a plurality of switch elements connected in the loop, each element being adapted to switch packets to and from an associated node and the loop. According to this aspect of the invention, the onus is put on a busy switch element (i.e., one that cannot transfer packets to its node) to ensure that packets addressed to it are returned on the loop; having put a packet on the loop, a source element is not required to monitor its receipt at the destination.

Preferably, the destination switch inserts a round-trip (RTP) flag in the packet intended for return. Any packet addressed to an earlier element without a 'round-trip' (RTP) flag is regarded a dead by later elements which are thus enabled to use its space on the loop for the transmission of other packets. Accordingly, packets intended for earlier (upstream) elements must have RTP flags when first put on the loop.

(The inverse arrangement, where all packets are round-tripped unless a flag is set by the destination to indicate reception is possible in fully buffered parallel loop systems and is regarded as equivalent to and embraced by the concept of the RTP flag, but such an arrangement is less desirable on a series loop.)

The switch elements and their associated nodes are addressed in sequence around the loop from the lowest to the highest in the direction of data flow, the switch element with the lowest address (called address 0) serves as a checkpoint. A function of the checkpoint is to remove all RTP flags from passing packets and all dead packets.

The checkpoint also plays an important role in handling broadcasts in accordance with this invention. A switch element wishing to initiate a broadcast to a group of other elements on the loop, issues a packet with a 'request to broadcast' (RQ_BCST) flag which the checkpoint removes and replaces with a 'broadcast' (BCST) flag before forwarding it on the loop. As the BCST packet transits each switch element, it is copied by that element and passed to its associated node for processing. The checkpoint removes all packets with BCST flags upon their return. If a switch element is busy when a broadcast packet is received, it must copy the packet, insert its own address, and put the copy onto the loop immediately after the original packet.

Packet-switches of the present invention may incorporate 'freeways'; that is, parallel sections of loop which bypass groups of switch elements (and even the checkpoint, provided its functions in relation to RTP flags and error checking are employed in the switch element at the entrance to the freeway), each end of which terminates in a switch element for interfacing to the parent loop. All non-broadcast packets with addresses higher than that of the downstream element of a freeway are transferred to the latter element for onward transfer, thereby by-passing the intermediate elements. In general, BCSTs would not be able to use freeways. Should the downstream element of a freeway be busy, the upstream element would temporarily cease diverting packets.

In this way, loop capacity is not devoted to the return of all packets to the source for elimination. This is of particular benefit in loops where much of the traffic is likely to be between neighboring nodes.

The switch may be implemented in any desired width up to the number of bits in the packet, though their operation will differ in detail. A one-bit-wide loop is a serial loop in which the switch elements (and their associated nodes) could be geographically distributed; more highly parallel forms would be compact items of equipment (perhaps integrated circuits) to which connections from outlying nodes would be made in star-wired fashion. The latter forms of switch can be extremely fast. A convenient degree of parallelism is that which corresponds to the number of bits in the header fields (loop address and type) of the packet.

The operation of a serial loop will differ in detail from that of more parallel loops because (depending on the degree of pass-through buffering) the first bits of a packet may stream onto the loop before the address has been read. For example, a busy switch element in a serial loop may not be able to read the addresses of incoming packets on the loop before they start to emerge again onto the loop at the output of the element. In that event, and if the element is busy, there will be no time to set the RTP flag and the packet will proceed through the switch. But a copy of the packet will be held in a pass-through buffer (herein called the 'hold FIFO' (first-in-first-out buffer) and can be placed on the loop, with its RTP flag set, immediately after the original packet, thereby ensuring that the packet will be eventually received.

According to another aspect, the invention provides a high speed packet-switched network suitable for voice/data transmission, which combines the DMT technique with packet switches of the type indicated above. Voice packets are transferred and sequenced and/or discarded in accordance with known techniques, while computer data is handled using DMT hardware located in each switch node. Where voice, computer data and other packets are assigned various levels of priority, each switch element preferably includes a series of short buffer queues (one for each level of priority) into which both packets on the loop, and packets awaiting transmission, can be assigned. An arrangement of this sort is disclosed by the above-mentioned CETT patent and does not form part of the present invention.

Because of its high speed and low latency, and because of the use of short packets, the the switches and methods of this invention are particularly suited to voice packet switching. Because of the use of the direct memory transfer technique disclosed, the invention is also particularly suited to the transfer of computer data. Moreover, both types of packets can be readily handled on the same network with the same switches.

Having broadly portrayed the nature of the present invention, particular embodiments will now be described with reference to the accompanying drawings by way of example and illustration.

MODES OF CARRYING OUT THE INVENTION

Network Overview

Figure 1:
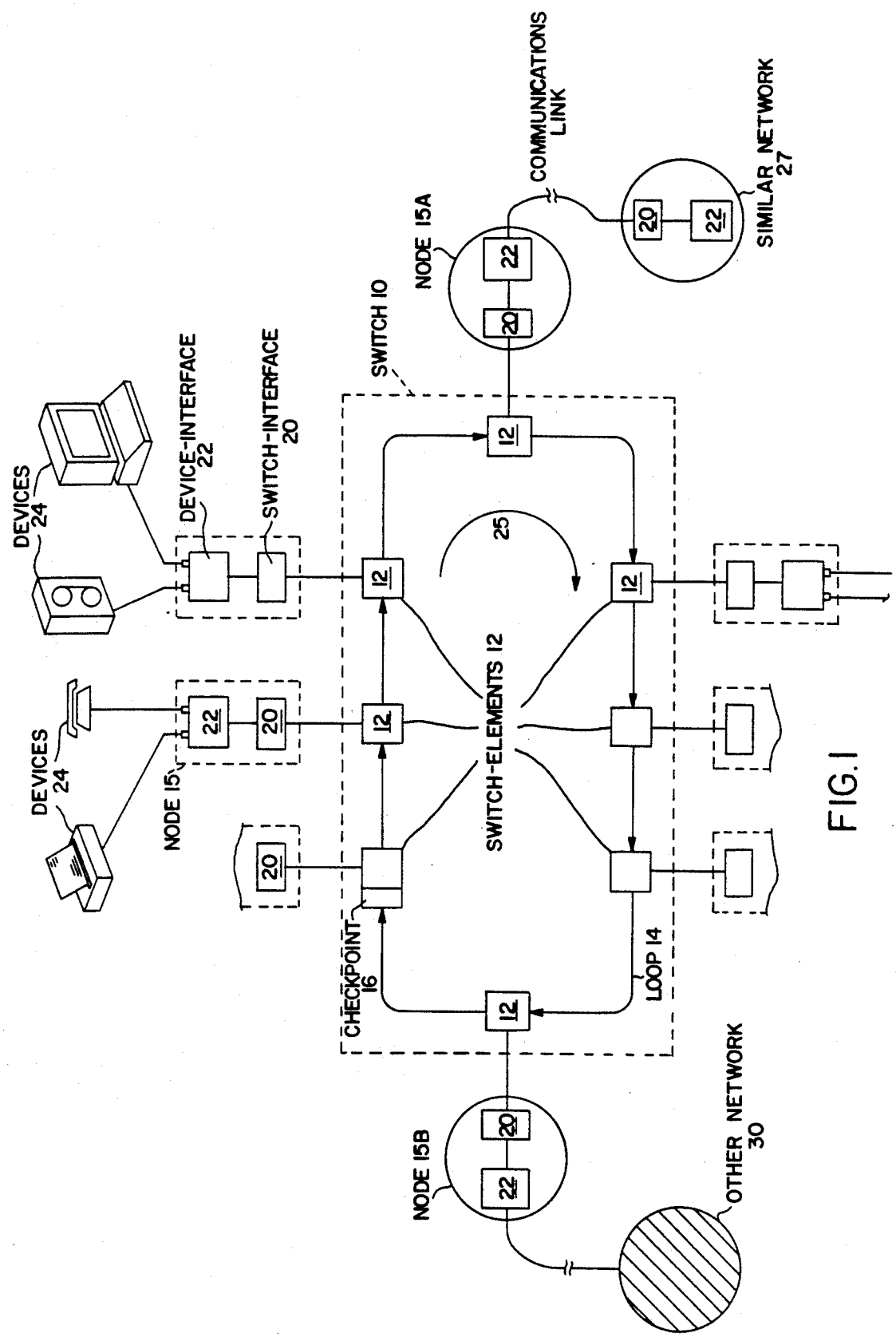
FIG. 1 is a general block diagram showing the basic elements of a packet switch formed in accordance with the invention, together with an associated network.

Referring to FIG. 1, the chosen network comprises a packet-switch 10 consisting of a plurality of switching elements 12 series-connected in a loop 14 of suitable transmission media, each element 12 being connected to a node 15. A check-point 16 is also included in the loop, conveniently as an addition to one of the switch elements 12, as shown.

Each node 15 comprises a switch interface 20 for connection to the respective switch element 12 and a device interface 22 which contains the node processor and by which a variety of terminal devices 24 are connected to the network. It is the function of switch interface 20 to respective packet and depacket data fed to and from device interface 22, and the function of device interface 22 to organize and feed data between devices 24 and switch interface 20. The node processor is a microprocessor which runs a resident windowing user interface for handling multi-session communications, protocol conversion routines for interfacing different devices to the network, dataphone enhancements, encryption services and the like.

In this example, switch 10 can accommodate 256 switch elements 12 (each with its node 15 and associated terminal devices 24) including one checkpoint. The switch elements are addressed by numbers progressing sequentially around the loop from the checkpoint (which is assigned the address of zero) with the direction of data flow, as indicated by arrow 25. The address of a switch element (and its node) is the loop address.

Not all nodes need be connected to terminal devices such as digital telephones, host computers, computer terminals, printers, plotters etc. The device interface of node 15A is configured as a bridge to communicate with a similar network 27 formed in accordance with the present invention, while device interface of node 15B is configured to communicate as a gateway to a dissimilar network such as the public telephone system, an X.25 packet-switched network, an Ethernet (TM) or the like. Such bridges and gateways perform address and, in the case of gateways, protocol transformations between networks in ways known in the art.

Figure 2:
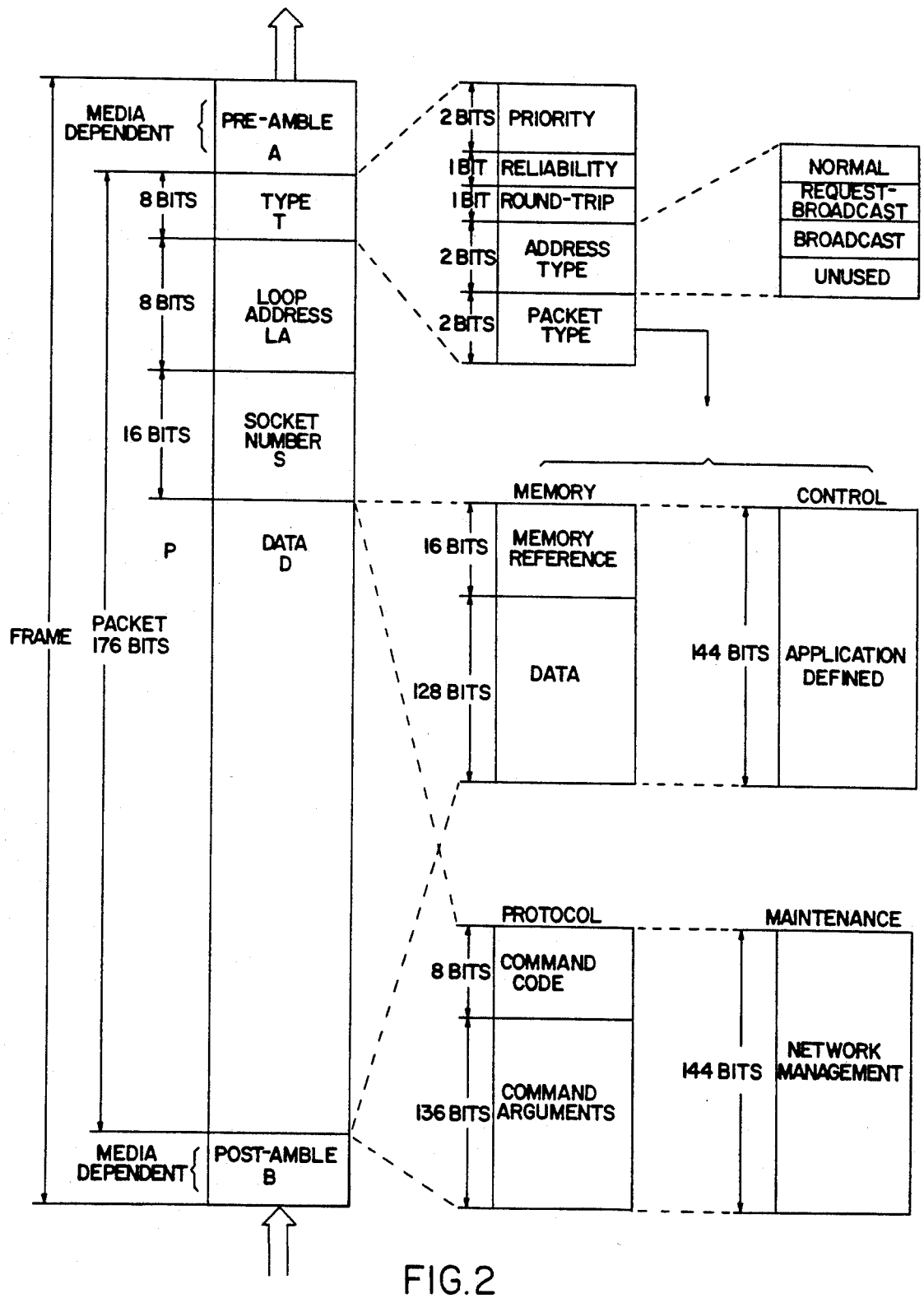
FIG. 2 is a diagrammatic illustration of the packet structure suitable for use in the switch and network of FIG. 1.

The format of the packets employed in this example is shown in FIG. 2. Block P depicts a packets of 176 bits comprising four fields: an 8 bit Type filed T, an eight bit Loop Address field LA, a 16 bit Socket number field S and a 144 bit Data field D. The first two fields form the packet header. Depending upon the transmission media employed and the Data Link Layer protocols, the packet may have a framing preamble A and postamble B, but these are not required within a compact, parallel-configured switch.

As shown by block T, the Type field itself comprises five sub-fields designating, respectively, the level of Priority of the service to be given to the packet (2 bits), the quality of the service in terms of Reliability (1 bit), a round trip (RTP) flag (1 bit), a 2 bit sub-field indicating how the socket address is to be interpreted (viz: as a socket address (normal), as a RQ_BCST, or BCST, and a Packet Type sub-field (2 bits) indicating whether the Data field is to be interpreted as memory, control, protocol or maintenance information; the packet therefore being referred to accordingly as a 'Memory packet', 'Control packet' etc.

The Socket field S identifies a session buffer in the address space of the node signified by the associated Loop Address, and corresponds to a half-session or simplex connection. There may, thus, be 64K simultaneous full session active at one time at one node, but one terminal device (such as a host computer) may account for many sockets, and there may be many devices connected to one node.

As shown by block M in FIG. 2, when the Data field is interpreted as memory information, the first 16 bits of this field will be read as a memory reference or offset, and the remaining 128 bits as a 16 byte segment of user data. It is this offset and its associated data segment that are the subject of the DMT technique of this invention. If the Data field is interpreted as control information, the entire 144 bits will be taken as an application-defined instruction to be passed to the node processor for interpretation in accordance with the communications or applications software running. If the Data field is interpreted as protocol information, the first 8 bits are used as a Command field and the remainder indicate the protocol function concerned; for example, a positive or negative acknowledgement (ACK or NAK) of a packet, an end of block transfer (EOT), or a request for status information (described below). Finally, the Data field may be interpreted as network management, maintenance and monitoring information.

One or more checksums may be incorporated in the packet to provide greater security for one or more fields in accordance with known techniques and are not shown in this illustrative example.

The allocation of the two levels of priority will not be described, being a known technique in register insertion systems, and will be assumed to be offered only in the 16 bit wide parallel version of the switch. It is implemented (but not shown) in that version by the use of two transmit FIFOs, one for high priority (voice) and the other for low priority (computer data) packets. Low-priority packets may be preempted from the hold FIFO of a switch element to allow a packet in the high-priority queue to be sent in its place, but the preempted low-priority packet is, preferably assigned to the high-priority queue.

The allocation of the two levels of reliability of transmission is determined by whether the Data packets have memory references or not. If so, the high-reliability bit in the Type field is set and the received packets are interpreted and acknowledged accordingly; if not, that bit is not set and the whole Data field is used for voice data which is handled in small buffers at the receiving end using conventional sliding window techniques.

In operation, data for transmission from, or reception by, each terminal device 24 is exchanged with device interface 22 under the control of an applications program running on the interface processor which assigns a socket number and buffer to each half-session (whether receive or transmit). In the case of voice data (digitized by known methods) the transmit socket may only be 16 bytes (one packet data segment) while the receive socket buffer for that connection may be a few times greater (so that sequencing and delay compensation can be performed by known methods using a small modulo). The size of the socket buffer for voice communications can be standard across the network and need not be negotiated during call setup. In the case of computer data, the size of each of the four socket buffers allocated to each connection (each end has a transmit and receive socket) is negotiated at call set-up and need not be symmetrical (though the socket buffers at each end of the same half session will be of the same size), can be as large as 1Mb, and can be dynamically adjusted during a session through the exchange of protocol, maintenance or control packets. Such communications between sockets are thus virtual duplex circuits.

The class (priority and reliability) of service to be assigned to outgoing packets, together with their loop and socket addresses and the base address of the transmit socket buffer (in the case of Memory packets) are assigned by the node software at call setup, and are recorded in a transmission table (to be described below with reference to FIG. 13). The switch interface 20 (a hardware device), is then able to fetch successive 16 8-bit byte segments of data from the appropriate location in each transmit buffer (in order of assigned priority), to add the header and destination socket number to each data segment to form a packet, and pass the packets in turn to the associated switch element 12. Switch element 12 then inserts the packets into the loop 14 without contention or arbitration (as described below).

The reception process is straight forward. Each switch element recognizes packets addressed to it and copies (or removes) them from the loop, stripping off the loop address (if desired) and transferring them in turn to the associated switch interface 20 where the Type and Socket fields are read by the hardware. In the case of Memory packets (which receive the high-reliability service), the switch interface combines the information in the incoming packet's Memory Reference field with information contained in a receive session table corresponding to the Socket Number field of the packet, to generate a specific memory address in the correct receive socket to which the 16 bytes of user data should be transferred, and effect the transfer of the data to that location. These actions implement the direct memory transfer mechanism of this invention without intervention of the processor at either of the associated device interfaces 22 (apart from call set-up and error recovery).

In the case of voice (typed as low-reliability) the packets are passed by the switch interface 20 directly to the appropriate socket buffers in the device interface 22 where appropriate sequencing, delay compensation and digital to analog algorithms are applied. The re-constructed voice signal can then be fed to the telephone terminal device corresponding to the receive socket. Enroute, the high priority voice packets will preempt the low priority computer data packets at each switch elements (as indicated above).

All other types of packets are also passed to the device interface 22 by the switch interface 20, but they are not directed into a socket buffer. Instead, they will cause an interrupt on the device interface processor and require some instruction to be service.

Figure 1A:
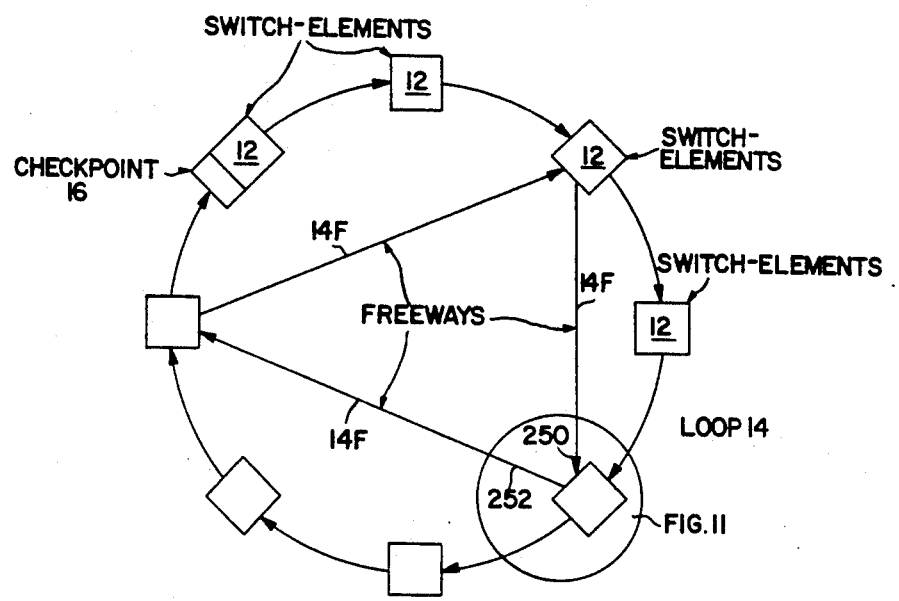
FIG. 1A is a block diagram illustrating the way in which 'freeways' may be implemented in the switch of FIG. 1.

FIG. 1A illustrates the use of 'freeways' 14F in the loop of the switch of FIG. 1. Each freeway by-passes a group of adjacent switch elements 12 on the loop. The switch element at the start of a freeway selects incoming packets that have high addresses than the address of the element at the exit of the freeway and switch such packets onto the freeway. Broadcast (and request to broadcast) packets are not routed on freeways. If a freeway bypasses the checkpoint, then the switch element at the start of the freeway must perform the role of a checkpoint in relation to RTP flags and, preferably in regard to the elimination of corrupt packets.

The Serial Switch Element

A distributed serial switch, in which the switch elements and their associated nodes are geographically spaced, is of value as a LAN system for a campus site. A loop of this nature would be of value in linking high-speed peripherals with a mainframe computer, for example. Given suitable line drivers, modulators and demodulators, any desired transmission medium may be employed to link the switch elements. As is common in such systems, the data is modulated on a continuous carrier that provides a clock signal for each switch element.

Figure 3:
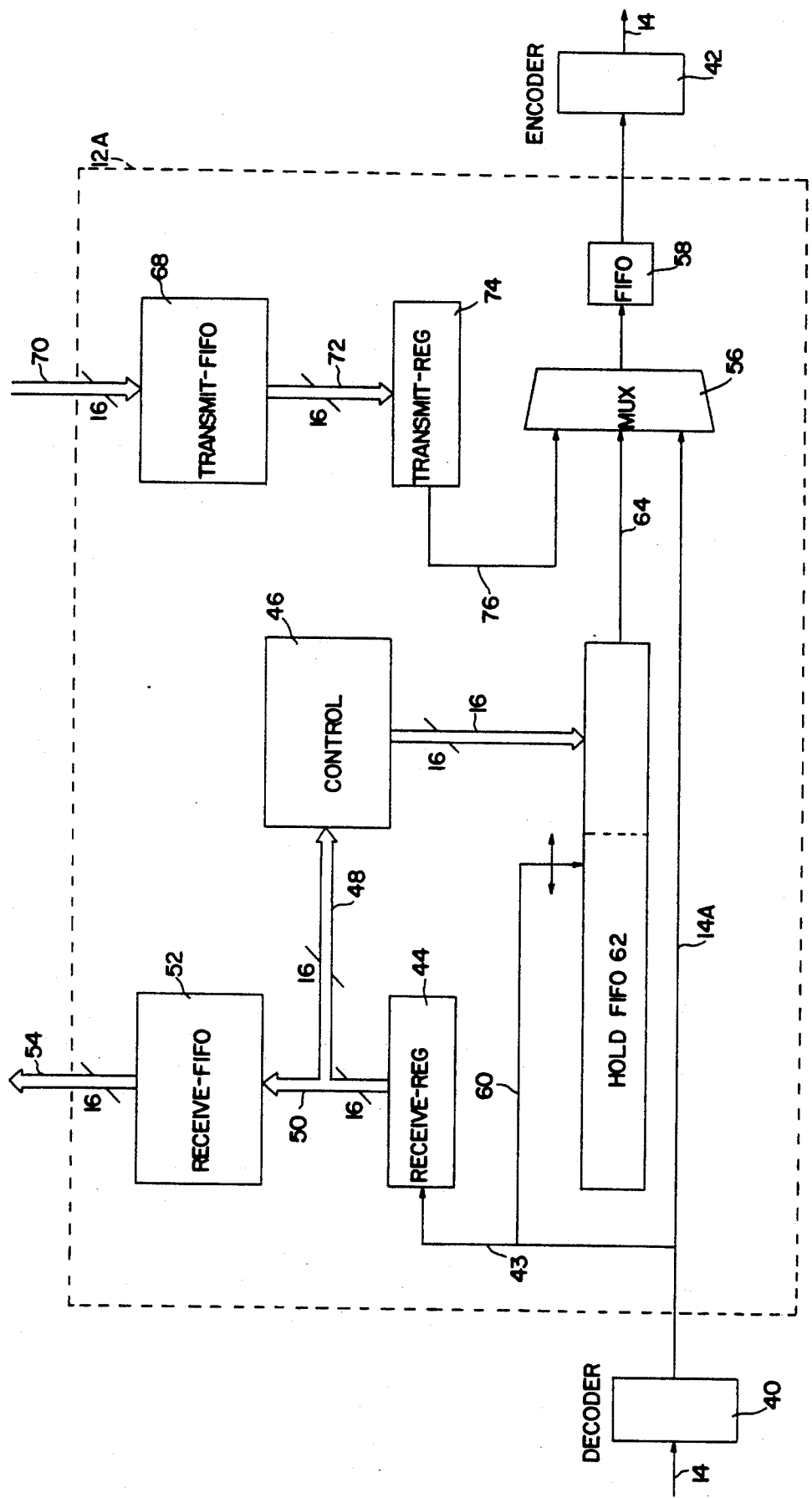
FIG. 3 is a block diagram of a serial implementation of a switch element of the packet switch of FIG. 1.

Referring to FIG. 3, the serial switch element 12A is preceded on the loop by a conventional decoder 40 which provides the clock signal, detects the start of a packet and decodes incoming packets. It is followed on the loop 14 by encoder 42 which encodes the data for serial transmission on the loop to the next switch element. While the loop 14 itself is only one bit wide, most other data paths in the serial switch element of this example are the width of the packet header (16 bits).

The bit stream of every incoming packet is fed from internal loop section 14A via line 43 into a 16 bit series-to-parallel receive register 44 so that the loop address and type fields can be read by a control logic unit 46 via input bus 48, and so that each word of packets addressed to the switch element can be shifted via bus 50 into receive FIFO 52 and via output bus 54 to the associated switch interface. The bit stream of each packet is also presented via loop section 14A to an output multiplexer 56 so that, if that data stream is selected, it will flow straight through the switch element to encoder 42 and onto loop 14 again. An isolating flip-flop 58 is interposed in the loop between multiplexer 56 and encoder 42 to provide a one bit buffer to mask switching transients in multiplexer 50. Multiplexer 50 normally is set to select data on the internal section 14A of the loop. Finally, the input bit stream is also presented via line 60 to a one-bit-wide, variable-length hold FIFO 62 from which it can be shifted to a second input 64 into multiplexer 56. Control logic unit 46 can over-write the first 16 bits of hold FIFO via bus.

On the transmit side of the switch element, packets for transmission are shifted into the transmit FIFO 68 via bus 70 from the associated switch interface. From the transmit FIFO 16 the packets can be shifted out in 16 bit words via bus 72 to a parallel-to-series transmit register 74 and from there as a serial bit stream to a third input to multiplexer 56 via line 78.

The operation of the serial switch element of FIG. 3 will now be described.

With receive FIFO 52 and transmit FIFO empty and multiplexer 56 in its normal state, the bits of an incoming packet stream into receive register 44, into hold FIFO 62 and through multiplexer 56 onto the loop again with only one bit delay. After the first 16 bits have been clocked in, the packet header in receive register 44 is read by logic unit 46. If an incoming packet is addressed to 'this address', or has its broadcast flag set, logic unit 46 shifts successive words of the packet as they fill receive register 44 into receive FIFO 58 and from there to the switch interface. In the meantime, however, the bits of the original packet have been streaming through multiplexer 56 from loop section 14A and are proceeding to the next switch element on the loop as a 'dead' packet (unless it is a broadcast).

A packet which is not a broadcast, is addressed to an earlier (upstream) node and or does not hae its RTP flag set, it is said to be dead. A switch element which allows incoming packets to flow straight through on the loop is said to be 'non-buffering'; one in which multiplexer 56 is switch to block the loop is said to be 'buffering'.

Should the receive FIFO 52 be full when the header of an incoming packet with 'this address' (or a broadcast) is clocked into receive register 44 (and when the switch element is non-buffering) it will be too late to set the RTP flag in the original packet in transit on the loop which will, against proceed as a dead packet. Instead, hold FIFO 62 is allowed (by the logic unit 46) to expand to accommodate all the bits of the incoming packet. The header of the packet will be clocked into both the receive register 44 and the first 16 bits of the hold FIFO at the same time so that the control logic 46 can recognise the address and set the RTP flag (and insert 'this address' in the case of a broadcast) in the packet header held in the hold FIFO 62. When the change has been made, and after the original packet has left multiplexer 56, the control logic 46 switches multiplexer 56 to select line 64 and proceeds to shift-out the modified packet from hold FIFO 62, shrinking that FIFO accordingly.

Should another packet arrive while the modified packet is proceeding in this way, its passage on loop 14A will be blocked by multiplexer 56, but it will be clocked into hold FIFO immediately behind the last bit of the first packet and its header will be read by the logic unit 46 after being clocked into receive register 44. It it is also for 'this address' and receive FIFO is still full, it will be shifted into the hold FIFO 62 until its header reaches the end (when control logic stops shifting the packet in) and its header will be modified as before and it will be put back on the loop as before.

If the switch element is buffering, and an incoming packet is a dead packet, hold FIFO will not be expanded to accommodate it and successive bits will be overwrite one another in receive register 44, thereby destroying the packet. If, however, it is a valid packet addressed to a down-stream element, it will be buffered by hold FIFO 62 and put on the loop (without modification) immediately after the preceding packet from FIFO 62.

With the switch element in the non-buffering state and a packet in transmit FIFO 68 for transmission, logic unit 46 switches multiplexer 56 to select line 76 (thus changing switch element to its buffering state) and the packet in transmit FIFO 68 is parallel-shifted word-by-word through transmit register 82 and then series-shifted onto the loop 14. Any packet arriving while this is taking place is handled as described above for the buffering switch element.

Broadcasts (BCSTs) are handled as indicated earlier. A non-buffering switch element will transfer broadcast packets straight onto the exit loop unchanged (to be read by all other switch elements), but upon recognising a BCST, control logic will shift it into the receive FIFO for transfer to the switch interface. If the switch element is buffering, the BCST packet will be shifted into the receive FIFo 52 as before, but it will be held by hold FIFO 62 until the packet in transit from transmit register 74 has departed, after which multiplexer 56 will select line 64 and the delayed BCST will be put back on the loop.

If, however, the switch element is buffering and the receive FIFO 52 is full, control logic 46 will change the packet header (held in hold FIFO 62) into a RQ_BCST and the address into 'this address'. This packet will proceed as a valid packet passed the checkpoint 16 on the loop where it will not be read by earlier elements (because of its non-zero address) until it reaches the original switch element which will recognise its own address. At the point (if the element is non-buffering) the packet will (i) proceed on the loop to be removed by the checkpoint (not having been read by other elements), (ii) be copied and shifted into the receive FIFO 52, and (iii) be held in the hold FIFO 62 while control logic changes it back to a regular BCST with the address of the checkpoint (zero) and then put back on the loop.

Any switch element wishing to initiate a BCST, issues a RQ_BCST packet addressed to the checkpoint, where the RQ_BCST flag is changed to a BCST flag and the packet put back on the loop.

Finally, it should be noted that the direct line (14A) through the switch element was included in the example to minimise delay in the non-buffering element. Without this, the switch element would work substantially as described but every packet would be delayed in the hold FIFO 62 long enough for the control logic to read enough of the header to make and effect a decision. This may be of no consequence on high speed loops with very short bit times, but is undesirable on loops with, say, twisted-pair media.

The Checkpoint

The checkpoint 16 (FIG. 1) for the serial switch is practically identical in design to the switch element just described. The most important difference is that its control logic ensures that it always buffers a whole packet so that the control logic can detect and eliminate a corrupt packet.

The basic function of the checkpoint is to remove all packets which do not have a RTP flag set, to remove any RTP flag in a packet, to convert all RQ_BCSTs (requests to broadcast) to BCSTs (broadcasts) and remove all dead packets from the loop. As before, the removal of packets is simply accomplished by not shifting them out of the hold FIFO and letting succeeding packets over-write them. One of the devices which may be connected to a checkpoint switch element is a network manager's console which allows a network manager to initiate broadcasts, regulate the rate of transmission from individual nodes, computer billings and generally monitor the system through the use of Maintenance and Control packets. To regulate the rate of transmission from switch elements, for example, each element would include a re-settable status counter to count packets passing through the transmit FIFO, and a re-settable control register accessible only to Control packets sent by the loop manager. (The status counter could also be directly interrogated by the loop manager for billing purposes.) The counters are compared from time to time and transmission of packets stopped when the status count is equal to that of the control register setting. The rate of transmission can thus be set by periodically resetting the status counter and adjusting the entry in the status register.

The 16-bit Parallel Switch Element

Figure 4:
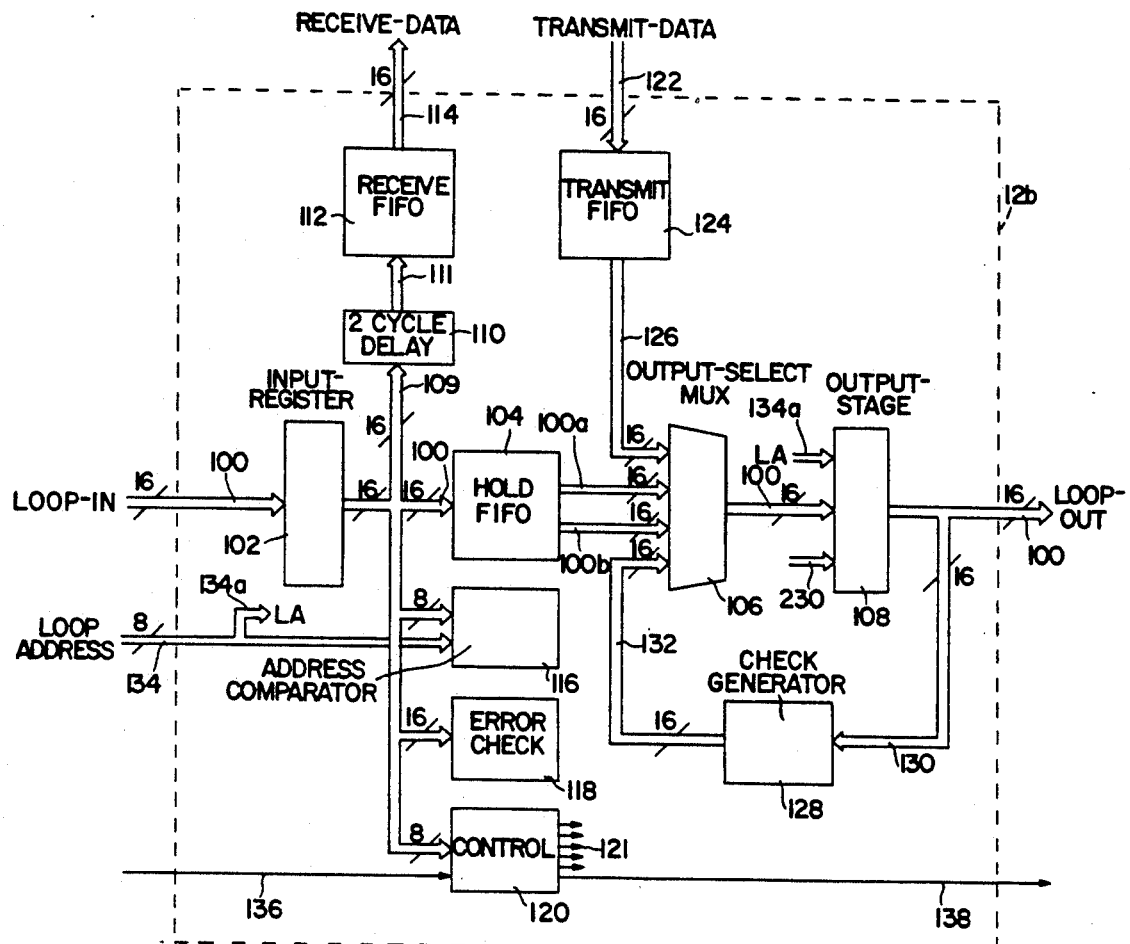
FIG. 4 is a block diagram of a 16-bit wide parallel implementation of a switch element of the packet switch of FIG. 1.

For high speed packet-switching and data transmission, some degree of parallelism is required in the loop media and packet switches formed in accordance with this invention can have any desired degree of parallelism up to the number of bits in a packet. The preferred minimum for a parallel loop system is, however, 16 as this is the number of bits in the header of the packet described above and it is a sum-multiple of the number of bits in the packet. A switch of this type will be a compact item of equipment and may even be implemented as a VLSI chip. A switch element for such a switch is described below with reference to FIG. 4.

The 16 bit bus which comprises the loop 100 enters the switch element 12B and serially transits an input register 102, a variable-length hold FIFO 104 and a multiplexer 106, but before leaving the switch element, it passes through an output stage 108. Encoders and decoders are not needed in this version of the switch as the switch elements are in very close proximity to one another. After input register 102, bus connections from the loop 100 are taken, (i) through a 2-cycle delay element 110 (via bus 111) and receive FIFO 112 to the switch interface via bus 114, and (ii), to an address comparator 116, error checker 118 and the control logic unit 120.

The control logic unit 120 will have many connections (indicated by arrows 121) to and from the other circuits in the switch element. These will be explained below, but are not shown for the sake of simplicity. The reason for the two output busses 100a and 100b from hold FIFO 104 to multiplexer 106 will also be explained below.

On the transmit side, packets received from the switch interface (in 16 bit words) are transferred via bus 122 to transmit FIFO 124 and from that FIFO to the multiplexer 106 via bus 126. Finally, an error check generator 128 receives the loop output from the switch element via bus 132 and computes a checksum which is then presented on bus 130 as another input to the multiplexer 106.

A convenient board-level implementation for such a switch is to run the loop and other common connections for the switch elements on a backplane into which each switch element board is plugged. In addition to the loop bus, the other data lines carried by such a backplane will include a 16 bit bus 134 (which sets the switch elements address according to the backplane socket used), and a first-word-in line 136 which is daisy-chained from switch element to switch element and signals when the first word of a packet is valid in input register 102. Thus, the control logic generates a first-word-out signal on line 138 which comprise the signal for the first-word-in line of the next element in the loop. Other backplane connections (not shown) will include, a 'hard' reset line, a clock line (25 Mhz) and power lines. This implementation assumes that the switch element and its associated switch interface are in close proximity, possibly on the same circuit board.

In operation, a packet word is clocked from one switch element to the next each clock cycle (giving the nominal rate of data transfer between switch elements of 400 Mhz). When the first word of a packet is valid in receive register 102 (as signaled one line 136), its address is compared with the address of this switch element in comparator 116 and control logic is signaled as to whether the packet address is greater or less than this address and whether it is zero, and it header is checked by circuit 118 and the control logic is signaled if there is an error.

Control logic 120 then routes the packet (by shifting successive words) in accordance with the principles described for the serial switch element of FIG. 3. That is: if the packet is valid and for 'this address' it is shifted into receive FIFO via the 2-bit delay 110 (included for ease of timing) and any packet waiting in FIFO 124 is shifted through multiplexer 106 onto loop 100; if it is dead, the first (and all later words are not shifted out of input register 102 and a waiting packet in transmit FIFO 124 can again be transmitted if the packet is valid but not addressed 'here', and if no packet is waiting in transmit FIFO 124 and the hold FIFO 104 is empty, the incoming packet is shifted (with a one word delay) through hold FIFO 104 and multiplexer 106 onto the loop 100; if an output packet (from FIFO) 124) is in transit through multiplexer 106, the incoming packet is shifted into hold FIFO 104 (which expands as needed);

and, if the receive FIFO is full, any incoming packet for 'this address' is stepped through hold FIFO 104 (being buffered as necessary) and into output stage where its header is modified appropriately. (The input LA into output stage 108 indicates that the loop address for this switch element is fed to that circuit so that it can be selected by the control logic 120 it if is needed in the case of a RQ_BCST.)

The suitable chips for use in the circuit of the switch element are listed in Appendix 2 so that those skilled in the art will be able to design and build a switch element to operate as described. However, further comment on some of the functional circuits is provided below.

Figure 5:
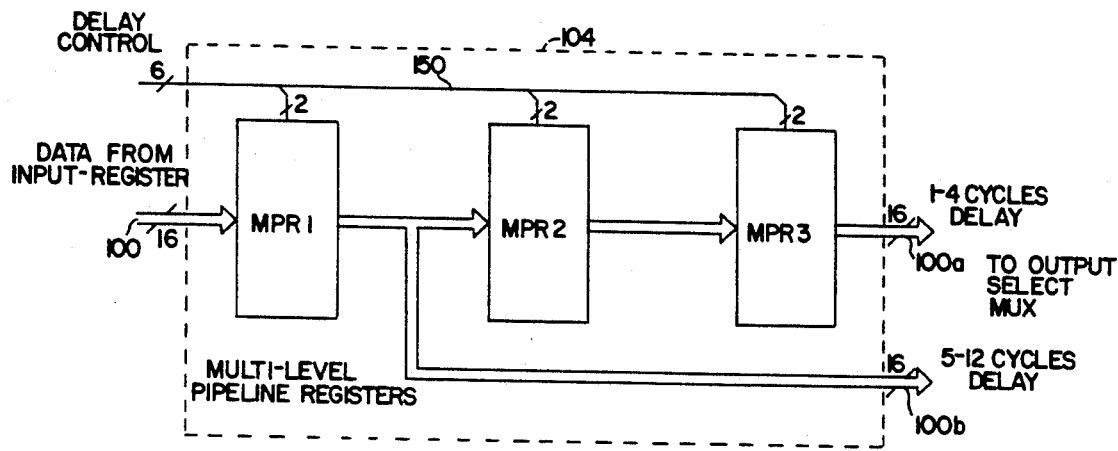
FIG. 5 is a circuit diagram of the hold FIFO of the switch element of FIG. 4.

Referring to FIG. 5, the hold FIFO 104 can be conveniently implemented using available 16 bit multilevel pipeline registers (MPRs) having a variable delay of between one and four cycles. Three Mars (MPR1, MPR2 and MPR3) are used in series to give a total delay of 1–12 cycles (the packet being 12, 16 bit words in length). Input bus 100 to the hold FIFO is the input to MPR1, while output bus 100a from the FIFO is the output of a series transition of all three Mars and output bus 100b is the output of the transition of only the first MPR. Control lines 150 (two for each MPR) are for the control signals from the logic unit 120. A 1–4 cycle delay is effected by the control of MPR1 and selection of bus 100b by multiplexer 106, while a 5–12 cycle delay is effected by control of all three MPRs and the selection of bus 100a.

Figure 6:
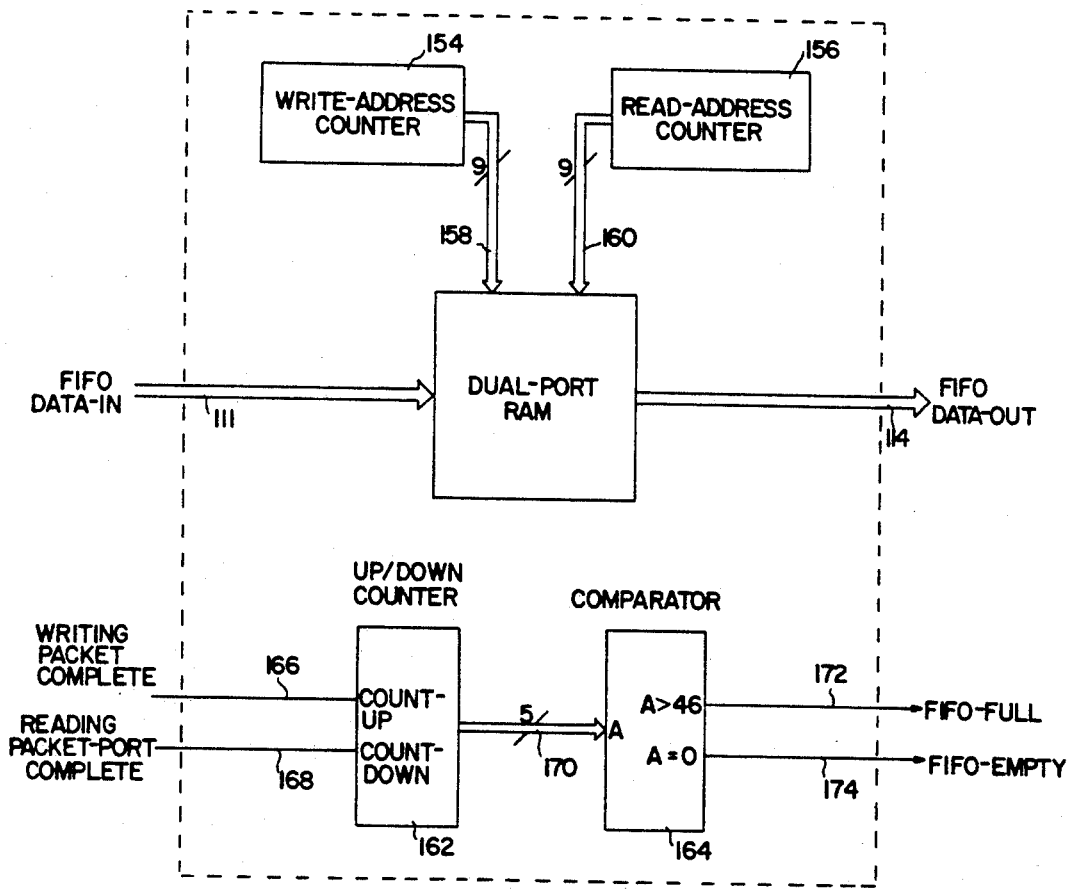
FIG. 6 is a circuit diagram of the receive (or the transmit) FIFO of the switch element of FIG. 4.

FIG. 6 illustrates the way in which the receive and transmit FIFOs may be constructed. The complication is that the logic unit 120 needs inputs signifying that each of these FIFOs are empty or full, meaning that they contain no packets or that no more (whole) packets can be fitted into them, but FIFOs constructed in the normal way from dual-port random access chips will only indicate empty when they contain no words and full when no more words can be fitted in. The operation of the receive FIFO 112 will be described, but transmit FIFO 124 can be identical. Input bus 111 feds the dual port random access memory unit 152 and output bus 114 leaves it and, also in the conventional way, unit 152 is controlled by a write address counter 154 and a read address counter 156 via respective write and read buses 158 and 160.

To maintain a packet count, an up/down counter 162 and a comparator 164 are employed as shown. Counter 162 receives count-up signals on line 166 and count down signals on line 168 from respective write complete and read complete signals derived from the counter 154 and counter 156 respectively. The running difference (representing the number of packets in RAm 152) is indicated on bus 170 to the comparator 164, which is set to provide a 'FIFO full' signal on line 172 and a 'FIFO empty' signal on line 174 when the count on line 170 is greater than 46 and less than one respectively. These signal lines are connected to the logic unit 120.

Figure 7:
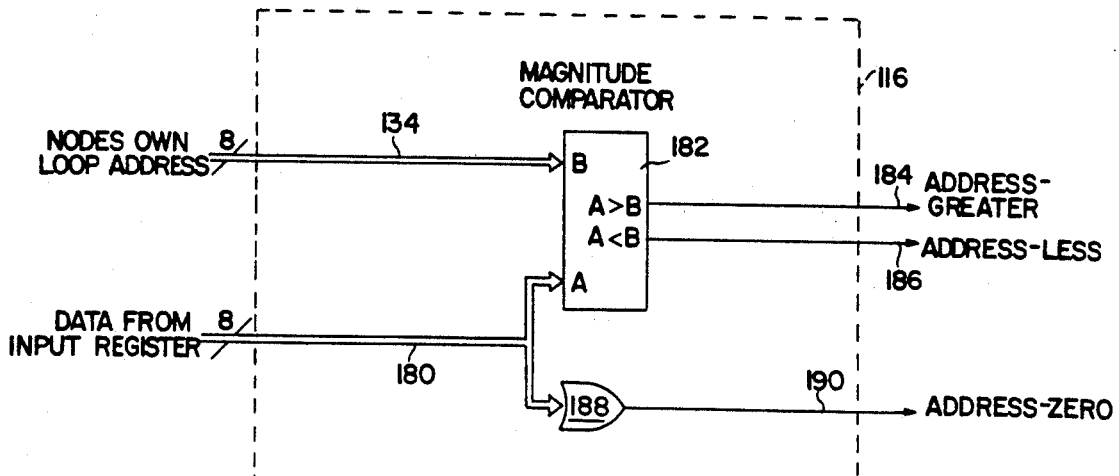
FIG. 7 is a circuit diagram of the address comparator of the switch element of FIG. 4.

FIG. 7 illustrates a suitable circuit for the address comparator 116, the inputs to which are 'this' loop address on 8 bit bus 134 and the loop address of the incoming packet (when its header is valid in input register 102), also an 8 bit bus. These two inputs are received by a magnitude comparator 182 which provides two output signals, one on line 184 when the loop address is greater than 'this address' and one on line 186 when the loop address is less than 'this address', both signals being fed to the logic unit 120. Finally, the address of the incoming packet on line 180 is fed to a NOR gate 188 which provides an output on line 190 when the input address is zero.

The error checker 118 (FIG. 8) receives the entire header field on bus 192 from the input register (when the first word of a packet is valid therein). This is fed to one input of an exclusive OR gate 194, the output of which is fed to a register 196 that, in turn, is connected to the second input of gate 194 via feedback loop. Output of gate 194 is then fed to an OR gate 202 via bus 203. In operation, the register 196 is initialized by the recording of a check sum via control line 204. When a packet header is received it is XOR'd with the checksum and, if the result is not zero on all lines of bus 203, an error is produced on signal line 206 to the control logic unit 120.

Figure 9:
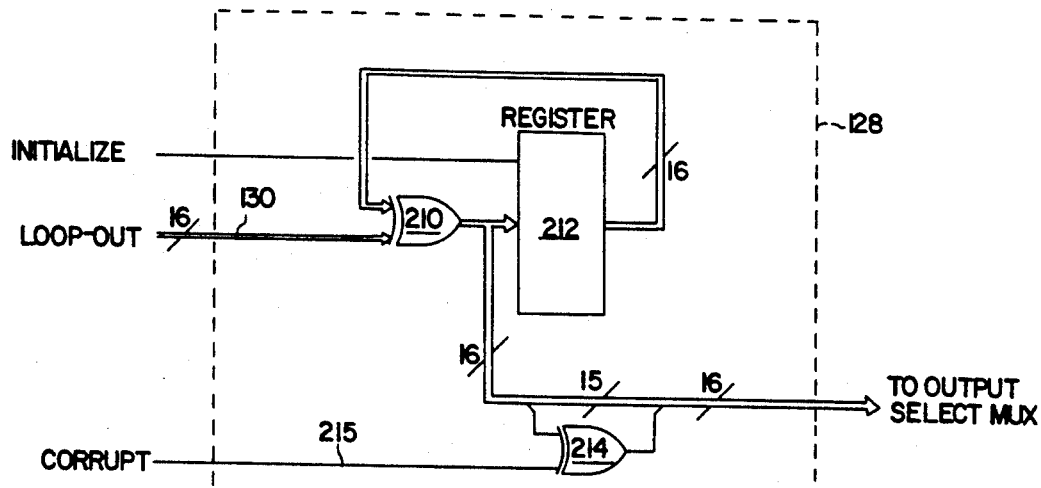
FIG. 9 is a circuit diagram of the checksum generator circuit of the switch element of FIG. 4.

The function of the error check generator (see FIG. 9) is tow fold: first, to compute a checksum after reading (via bus 130) all the bits of each successive word of a packet leaving the switch element on bus 100, and to write that checksum (via bus 132 and multiplexer 106 in FIG. 4) into the postamble of the packet; and, second, to place a corrupt checksum into any packet found to be corrupt by error checker 118 so as to ensure that any change made to the header in the next switch element does not, by chance, make the checksum correct. Referring to FIG. 9, it will be seen that an OR gate 210 and register 212 are connected as in the error checker of FIG. 8 and that there is no or gate in output bus 132. Instead, one of the lines from bus 132 is XOR'd by gate 214 with the signal on line 206 from error checker 118. This effects the corruption of the checksum generated.

Figure 10:
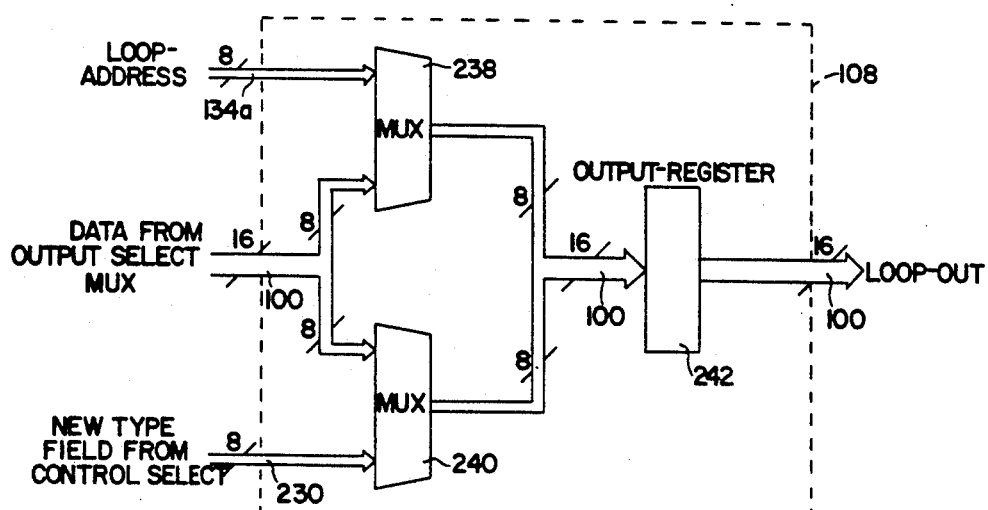
FIG. 10 is a block circuit diagram of the output stage of the switch element of FIG. 4.

FIG. 10 provides a detail of output stage 108, the function of which is to insert 'this address' in any RQ_BCST via 8 bit bus 134a and to insert any modifications to the 8 bit Type field via 8 bit bus 230 from the control unit 120. Bus 134a and bus 230 are presented as input to respective multiplexers 238 and 240, which also each receive the corresponding half (8 bits) of the 16 bit loop bus 100, the respective 8 bit buses from multiplexers 238 and 240 being combined to form the 16 bit loop bus 100 which is fed to an isolating register 242 before leaving output stage 108 and the switch element. In operation, when the first word of a packet is clocked from multiplexer 106 on the loop bus, control logic unit 120 switches multiplexers 238 and 240 to select the appropriate inputs to create a modified header, or to leave it unmodified; there-after and for the remainder of the packet, the multiplexers are switched to their normal conditions which is to select the two loop bus inputs.

Figure 11:
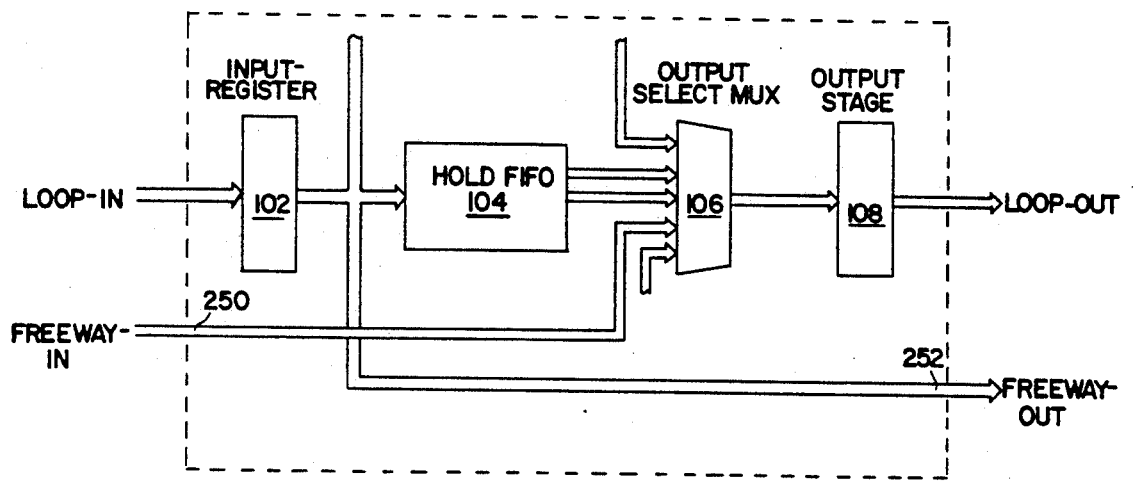
FIG. 11 is a block circuit diagram showing the way in which freeways may be connected to the switch element of FIG. 4.

Finally, freeways may be implemented in parallel forms of the switch element and, in view of the lack of geographic constraints and the much higher capacity of parallel switches, the use of freeways is likely to confer greater benefits in the parallel configuration of the switch and loop. FIG. 11 (in conjunction with FIG. 1A) indicates how the 16 bit switch element of FIG. 4 can be readily modified to provide for inputs and outputs to freeways, like parts in both Figures being numbered the same. As will be seen, an input freeway 250 can simply enter the switch element as another input to multiplexer 106, being selected by the control unit 120 (not shown in FIG. 11) when, (i) a valid packet header is presented in register 102 with an address greater than that at the end of output freeway 252, and (ii) when control unit 120 receives a signal indicating that multiplexer 106 at the other end of freeway 525 is not switched to another input and that the other switch element is not in the buffering state. Should either of these conditions occur, the packet (the header of which is in register 102) will be routed as normal.

The Switch Interface and Direct Memory Transfer

Figure 12:
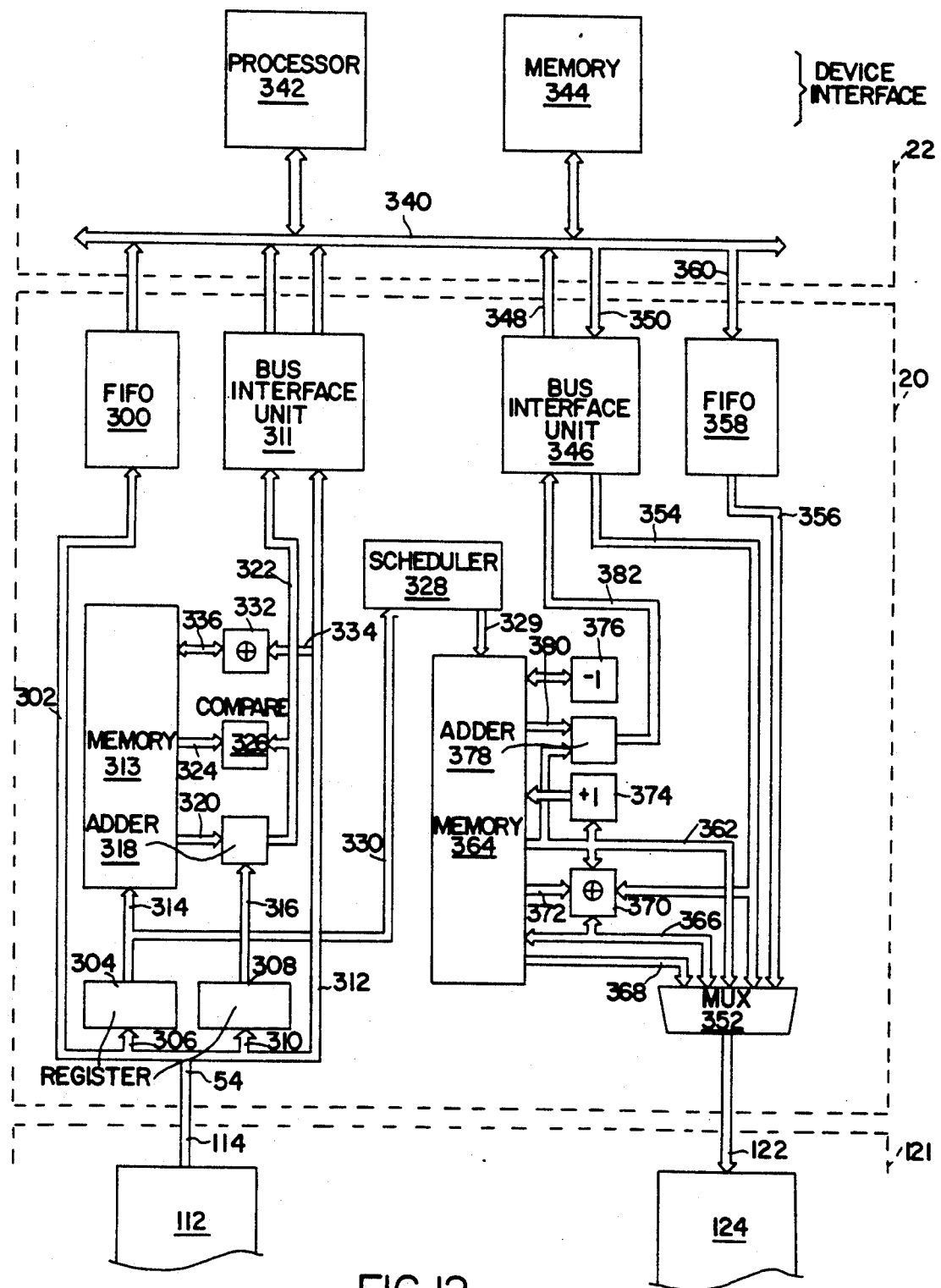
FIG. 12 is a block diagram of a switch interface incorporating the direct memory transfer hardware.
Figure 13:
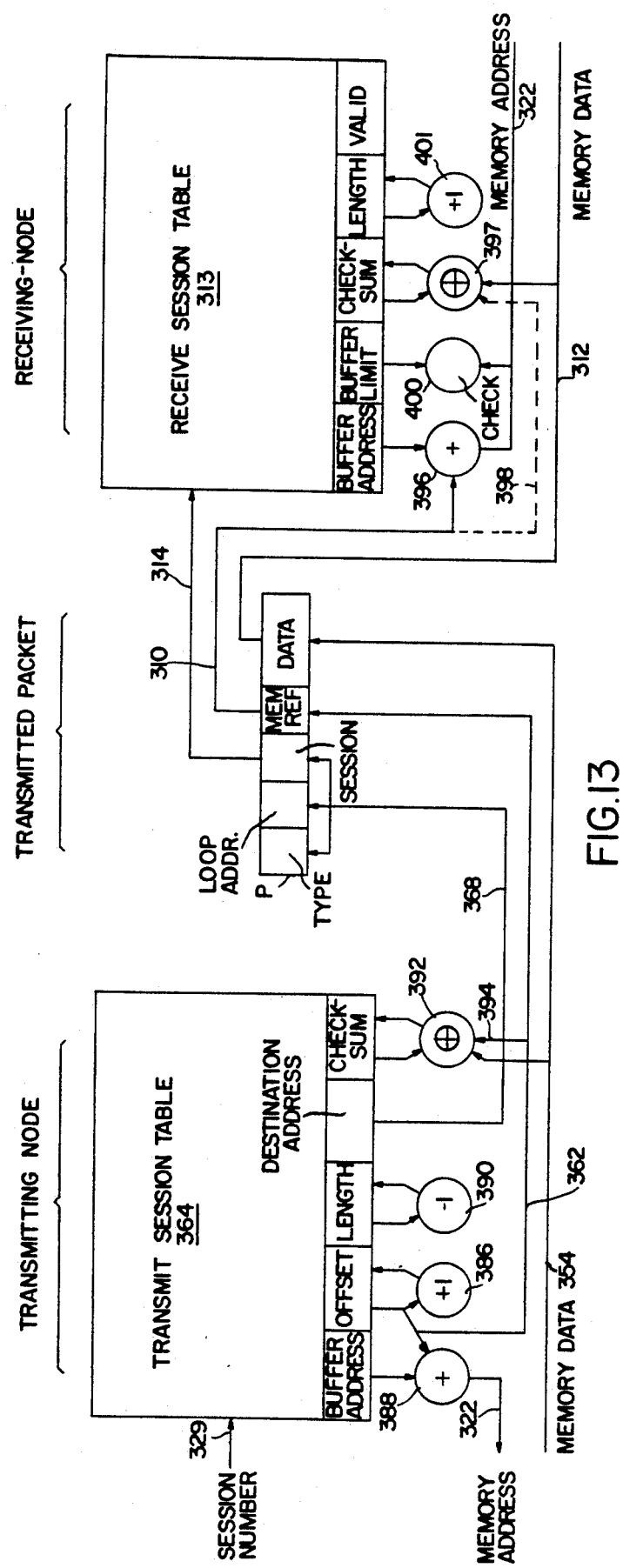
FIG. 13 is a logic and flow diagram illustration the functions of the direct memory transfer method.

The switch interface 20 and its connections to the device interface 22 (see FIG. 1) is shown in detail in FIG. 12 and its logical operations are diagrammatically shown in FIG. 13. It should be noted, however, that FIG. 12 is a diagram of the essential hardware components for both the transmit and receive side of one switch interface, while the logical operations of FIG. 13 assume a virtual connection (via packets on the network) between the transmit side of the switch interface associated with one switch element and the receive side of another switch interface associated with the input side of another switch element. It should also be noted that the packets presented in the switch interface in this example are truncated; that is they are without their loop address field, this information having already been used.

Referring to FIG. 12, packets from the receive FIFO of the associated switch element 12 or 12b are shifted (word by word) into the associated switch interface 20 via bus 54 and distributed to a control packet FIFO 300 via bus 302, a socket register 304 via bus 306, an offset register via bus 310, and to an output bus interface unit 311 via bus 312. Socket register 304 and offset register 308 respectively latch-in the socket address and the offset fields of each incoming packet, the socket number being used to index a receive session table 312 via bus 314 and the offset being passed by bus 316 to adder 318 which adds the base address on bus 320 (corresponding to the indexed socket number) read from table 312 and presents the sum as a memory address to output bus interface unit 312 via 24 bit bus 322.

Also read out (via bus 324) from the session table is the address for the expected end of the block for that session number which is sent to the bus interface unit 312 on bus 322, and used in the limit check circuit 326. Upon the receipt of an end-of-block packet is received from the transmit end with its checksum, the two checksums are compared and, a signal is sent to an output scheduler 328 via a control line (not shown) indicating that an end of block ACK (or NAK) packet should be queued in the scheduler for transmission, the relevant receive socket number for that session being provided by socket register via bus 330. As each word of each packet of a block is transferred to bus interface 312 on line 314, its bits are employed in the running computation of a block checksum and, at the end of the block, the final computed checksum is compared with that read out from the receive session table 302. This process is indicated by the + symbol at 332 and busses 334 and 336. It is this computation that determines whether an ACK or a NAK is sent at the end of a block transmission.

The bus interface unit and the control packet receive FIFO are connected to processor bus of the device interface 20, the processor and its memory being generally indicated at 342 and 344. Each control packet in FIFO 300 causes an interrupt to the processor, but the interface unit 312 is able to write data direct to memory 344 without requiring processor intervention. The session buffers are sections of memory 344.

On the transmit side, a second bus interface unit 346 also interacts with the processor bus 340 and memory 344 without generating interrupts; it places a read address on the bus 340 (via bus 348) and accepts the data read from memory 344 via bus 350. The data (in successive words for inclusion in an outgoing Memory packet) is presented to multiplexer 352 (via bus 354) by the action of which packets are assembled and forwarded (as a series of 11 words) to the transmit FIFO of the switch element 12 or 12A. The other inputs to multiplexer 352 are: bus 356 from a FIFO 358 for control packets (loaded therein from bus 340 via bus 360 under programmed control of processor); the offset field data derived via bus 362 from a transmit session table 364; the block checksum, also derived from table 364, via bus 366; and the loop address on bus 368 for the outgoing packet, also derived from the table 364.

As shown symbolically by the plus sign at 370, the block checksum is built from inputs from the data bus 354, the offset bus 362 and the accumulated or running checksum from table 364 via bus 372. With each word transmitted, the offset derived from table 364 via bus 362 is incremented; this is indicated symbolically at 374. The count of the remaining words to be sent in the block is decremented each time a word is sent and that is symbolically indicated at 376. Finally, the address from which the original data was read in memory 344 is generated by adder 378, which receives the base address from the session table 364 (via bus 380) and the offset (from bus 362) and transmits the result on bus 382.

Referring to FIG. 13 which illustrates the above process in a different way, the data flow is from left to right; from the read address (bus 322) and data (bus 354) at the source and using the transmit session table 364 to build the packet P (which transits the network), to the memory write address (bus 322) using the receive session table 313.

On the transmit side, as will be seen from FIG. 13, the socket number (on bus 329 from scheduler 328, FIG. 1) indexes transmit session table 364, providing the base address, the offset, block length, destination address (including type, loop address and socket number) to be entered into each packet; the 11 words of data associated with that packet being provided on bus 354. The data in (the whole of) each packet is used to build the transmit block checksum as indicated. The offset for each packet is computed by incrementation as shown at 386 and, together with the base address (as shown at 388), furnishes the read memory address on bus 322 for the data on bus 354 for that packet. As each packet is despatched, the block length still remaining is decremented, as indicated at 390.

On the transmit side, the block checksum is accumulated from the data for each packet and up-dated in the table 364 each packet, as shown at 392. It is preferable, as shown by the dotted line 394, to include the offset field in the checksum so that there will always be a varying quantity in the accumulating block checksum, even if the data is constant.

On the receiver side, the session number field (derived from the packet) on bus 306 again indexes the table giving the base address, the block limit, accumulated block checksum, and the remaining block length. The valid session field is included to allow data to spurious addresses to be discarded.

The memory reference or offset on bus 310 is added to the base address (as indicated at 396) to furnish the write address on bus 322 to the memory in the device interface. The 8 words of data contained in the packet are transferred on bus 312 to the address signified on bus 322, and also contribute to the running block checksum calculated (as shown at 397). The offset is used, as before, as an input to the block check sum calculation (as indicated by dotted line 398), and also as a means of checking to see that the block limit has not been exceeded (as shown at 400). Finally, the number of packets received (or the length of the data accumulated data block) is incremented for each packet as shown at 401.

INDUSTRIAL APPLICABILITY

The industrial applicability of this invention and its embodiments has already been indicated. However, it will be appreciated by those skilled in the art that there will be many different ways in which this invention may be applied in practice without departing from the principles disclosed or claimed in the following claims. For example, a half-parallel (92 bit) switch using the packets described and running on a 30 nano second cycle time (33.3 Mhz) would have a data transfer capacity of 3.2 Gb/s. It will also be seen that the direct memory transfer principle need not be used only with the improved switch, or vise versa, though only the combination will yield the full benefits and advantages disclosed herein.

REFERENCES

Ahuja, V., "Design and Analysis for Computer Communication Networks" McGraw-Hill, 1985

Bridges, C. P., "Low Cost Local Area Networks" (Halstead Press, N.Y. 1986)

Farmer, W. D., and E. E. Newhall, "An experimental distributed switching system to handle bursty computer traffic". Proc. ACM Symp. Problems Optimization Data Comm. Systems, Pine Mountain Georgia, Oct. 1969.

Hafner, "A Digital Loop Communication System" (IEEE Transactions on Communications, vol. COM-22 No. 6, Jun. 1974)

Hayes et al, "Traffic Analysis of a Ring Switched Data Transmission System" (Bell System Technical Journal, vol. 50, No. 9 Nov. 1971; pp. 2947-2978), Majithia et al, "Analysis and Simulation of Message-Switched Loop Data Networks" (Proc. IEE vol. 124, No. 3 Mar. 1977).

Reames, C. C., and M. T. Liu, "A loop network for simultaneous transmission of variable length messages". Proc. Ann. Symp. Comput. Architecture, Jan. 2, 1975.

Reames C. C., and M. T. Liu in, "Design and simulation of the Distributed Loop Computer Network (DLCN)". Proc. Ann. Symp. Comput. Architecture Jan. 3, 1978.)

Shiva, S. G., "Computer Design and Architecture", Little, Brown and Co., 1985.

Tanenbaum, A. S., in "Computer Networks" (Prentice Hall, 1981).

Tropper, C., "Local Computer Network Technologies", Academic Press, 1981

APPENDIX 2-1

| Component Name. | Reference No. | Part No. | Quantity. | Manufacturer Ref. |
|---|---|---|---|---|
| | | For FIG. 5. | | |
| MPR1 | | Am29521 | 2 | AMD |
| MPR2 | | Am29521 | 2 | AMD |
| MPR3 | | Am29521 | 2 | AMD |
| | | For FIG. 6. | | |
| Address counter | 154 | 74F161 | 3 | Fairchild |

APPENDIX 2-1-continued

RECOMMENDED PARTS

Figure 8:
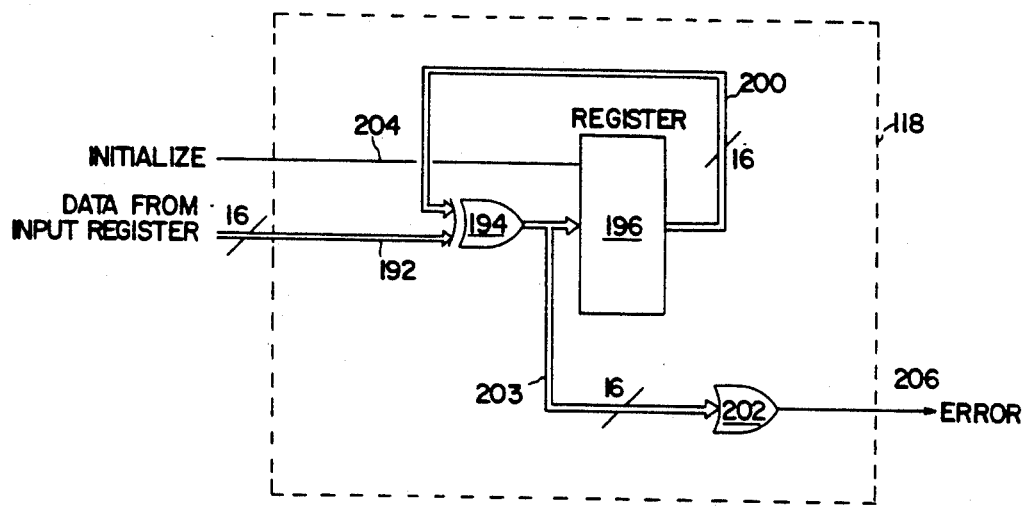
FIG. 8 is a circuit diagram of the error-check circuit of the switch element of FIG. 4.

| Component Name. | Reference No. | Part No. | Quantity. | Manufacturer Ref. |
|---|---|---|---|---|
| Address counter | 156 | 74F161 | 3 | Fairchild |
| Dual-port ram | 152 | 74F399 | 3 | Fairchild |
| Dual-port ram | 152 | CY7C123 | 8 | Cypress |
| Up/Down counter | 162 | 74F192 | 2 | Fairchild |
| Comparator | 164 | 74AS885 | 1 | TI-LSI |
| Comparator | 164 | Am25LS2521 | 1 | AMD |
| | | For FIG. 7. | | |
| Comparator | 182 | 74AS885 | 1 | TI-LSI |
| Nor-gate | 188 | 74S260 | 1 | TI |
| Nor-gate | 188 | 74F08 | ½ | Fairchild |
| | | For FIG. 8. | | |
| Xor-gate | 194 | 74F86 | 4 | Fairchild |
| Register | 196 | 74F374 | 2 | Fairchild |
| Or-gate | 188 | 74S260 | 1½ | TI |
| Or-gate | 188 | 74F20 | ¼ | Fairchild |

APPENDIX 2-2

For FIG. 9.

| Component Name. | Reference No. | Part No. | Quantity. | Manufacturer Ref. |
|---|---|---|---|---|
| Xor-gate | 210 | 74F86 | 4 | Fairchild |
| Xor-gate | 214 | 74F86 | ½ | Fairchild |
| Register | 196 | 74F374 | 2 | Fairchild |

Key to Manufacturer Ref.

| Manufacturer Ref. | Book. |
|---|---|
| AMD | Advanced Micros Devices Bipolar Microprocessor Logic and Interface 1985 |
| Fairchild | Fairchild Fast Data Book 1985 |
| TI | Texas Instruments The TTL Data Book Volume 2 1985 |
| TI-LSI | Texas Instruments LSI Logic Data Book 1986 |
| Cypress | Cypress Semiconductor Cmos Data Book 1987 |

The claims defining the invention are as follows:

1. A packet switched data communications network, which transfers a block of data from a source memory buffer associated with a first node o the network to a destination memory buffer associated with a second node on the network comprising:
    a data communications loop including a plurality of switch elements, coupled, respectively, to said first and second nodes to provide a data communications link between said first and second nodes, said data communications loop conveying self-addressed packets from said first node operating as a source to said second nodes operating as a destination wherein:
    each of said first and second nodes includes an addressable memory buffer which holds at least a first one of said self-addressed packets when the node is operating as one of said destination nodes;
    each of said switch elements comprises a transfer buffer for holding a second one of said self-addressed packets, received from said data communications loop, while the node coupled to said switch element is transmitting a third one of said self addressed packets via said switch element to said data communications loop, and each of said self addressed packets includes:
- a data field for a segment of user data to be conveyed on the data communications loop by the packet;
- a first address field for identifying the addressable memory buffer at the destination node; and
- a second address field for indicating a starting address in said memory buffer at which to store said data segment; and said packet switched data communications system further comprises:
- means for transferring successive segments of data from the block into the respective data fields of successive ones of said packets,
- means for writing an offset of each data segment from a base address in the source buffer into the second address field of the packet containing that segment,
- means for identifying the destination memory buffer in the first address field of each packet,
- means for transmitting said packets through the system, and
- means for writing the data segment of each packet as it arrives at the second node into an address in said identified destination memory buffer, said address being signified by the combination of an offset in the second address field of the respective packet and a base address corresponding to the destination memory buffer.

2. A method according to claim 1 including the steps of:
- generating a transmit block checksum for the successive data segments while writing the successive data segments into the successive packets at the source node;
- generating a receive block checksum for the successive data segments while writing successive data segments to the destination memory buffer;
- sending at least one packet from the source node to the destination node to signify the end of the block transfer and to communicate the transmit block checksum;
- comparing the transmit and receive block checksums at the destination node; and
- sending a positive or negative acknowledgement in a packet from the destination node to the source node depending on the results of said comparison.

3. A packet-switched system, having a plurality of switch elements interposed in a loop and each having a loop address, for transferring packets around the loop, the switch elements being connected to respective nodes which act to packet and depacket data for transfer between terminal devices connected to the nodes and the switch elements, wherein:

each node has at least one addressable memory buffer;

each packet includes:
- a header of predetermined length;
- a data field for a segment of user data to be conveyed on the system by the packet;
- a first address field for identifying the addressable memory buffer at the node;
- a second address field for indicating a destination address in said memory buffer for said data segment; and
- a third address field for indicating the loop-address, the switch elements acting to insert and remove the packets onto and off the loop without collision between the packets, whereby if one of the switch elements is unable to take one of the packets addressed to the one switch element off the loop, the one switch element marks the packet which it is unable to take for returning around the loop; and each switch element comprises:
- a loop input and a loop output and a variable length hold FIFO buffer capable of holding an entire packet connected between said loop input and loop output;
- a receive register, of at least the same length as the header of the packet, connected to the loop input and adapted to output packets to the associated node;
- an output register switchably connected to the loop output for conveying packets input to the switch element from the associated node; and
- control logic means for:
  - reading the header of each incoming packet in the receive register;
  - effecting the transfer of originating packets from the output register onto the loop;
  - effecting the transfer of incoming packets addressed to said element to the associated node;
  - eliminating packets addressed to upstream elements;
  - passing on packets addressed to downstream elements or buffering the latter packets in the hold FIFO until the transmission of an originating packet has been completed; and
  - buffering packets addressed to said switch element but which cannot be passed onto the associated node in the hold FIFO while effecting modification of the header of said packets to ensure their return on the loop, and then transferring said packets to the loop output.

4. A packet-switched system as set forth in claim 3 in which each switch element includes a direct connection in parallel with said hold FIFO so that an incoming packet will proceed substantially directly onto the loop output if an originating packet is not being put on the loop, and wherein the control logic places a modified packet from the hold FIFO on the loop immediately after the original of that packet has proceeded from the switch element onto the loop.

5. A packet-switch according to claim 4 characterised in that one or more loop connections are made between switch elements in the loop that are not adjacent to each other thereby bypassing the intervening elements to produce a by-pass, and that the control logic of the upstream element on the by-pass effect the switching of packets addressed to elements downstream of the other switch element on the by-pass to the other element, the by-passed packets being selected for transfer onto the loop by the control logic of the switch element at the downstream end of the by-pass.

6. In a packet-switched data communications system, having a plurality of nodes associated with respective switch elements which are arranged in a loop, for conveying self-addressed packets from source ones of said nodes to destination ones of said nodes, each switch element comprising:

a loop input port, a loop output port and a variable length hold FIFO buffer connected between said loop input and loop output ports, said hold FIFO buffer having a sufficient number of storage locations to hold an entire packet;

a receive register, connected to the loop input port and adapted to convey packets arriving at the loop input to the node that is associated with the switch element;

an output register switchably connected to the loop output port for conveying packets input to the switch element from the associated node; and control logic means for:

reading the address of each incoming packet in the receive register;

effecting the transfer of originating packets from the output register onto the loop;

effecting the transfer of incoming packets addressed to said switch element to the associated node;

passing on packets addressed to other switch elements that are downstream of said switch element or buffering the latter packets in the hold FIFO until the transmission of an originating packet has been completed; and buffering packets, addressed to said switch element but which cannot be passed onto the associated node, in the hold FIFO while effecting modification of said packets to ensure their return on the loop to the switch element, and then transferring said packets to the loop output.

* * * * *